United States Patent [19]

Lambou et al.

[11] 3,960,763

[45] June 1, 1976

[54] AGRICULTURAL FOAMS AS CARRIERS FOR ACTIVATED CHARCOAL

[75] Inventors: Madeline G. Lambou; James J. Spadaro, both of New Orleans; Eunice M. Rusch, Metairie, all of La.

[73] Assignee: The United States of America as represented by the Secretary of Agriculture, Washington, D.C.

[22] Filed: July 17, 1974

[21] Appl. No.: 489,797

[52] U.S. Cl. .................................. 252/428; 47/9; 47/58
[51] Int. Cl.² ......................................... B01J 31/02
[58] Field of Search ............ 252/428; 427/4; 71/64, 71/5 C; 47/9, 58

[56] References Cited
UNITED STATES PATENTS

| 3,336,129 | 8/1967 | Herrett | 47/9 X |
| 3,422,569 | 1/1969 | Lyon | 47/9 |
| 3,648,409 | 3/1972 | Johnson | 47/57.6 |
| 3,790,395 | 2/1974 | Eron | 47/9 |
| 3,812,619 | 5/1974 | Wood | 47/9 X |
| 3,871,130 | 3/1975 | Lavo | 47/9 |

FOREIGN PATENTS OR APPLICATIONS

| 557,366 | 3/1957 | Belgium | 47/1 |

Primary Examiner—Patrick P. Garvin
Assistant Examiner—John F. Niebling
Attorney, Agent, or Firm—M. Howard Silverstein; Max D. Hensley; Salvador J. Cangemi

[57] ABSTRACT

Economical foams have been prepared from selected formulations containing whey solids, animal glue, surfactants, viscosity-builders, and activated charcoal. These foams are lightweight and act as carriers for the charcoal. Easy handling and dispersibility of the activated charcoal was accomplished by a combination of surfactants, either one being used as a wetting agent to control the activated charcoal and the other added to the remainder of the formulation. When applied broadcast on the soil, these foams are useful in removing from the soil residual toxic herbicides and pesticides which can cause significant damage to a sensitive succeeding crop.

6 Claims, No Drawings

AGRICULTURAL FOAMS AS CARRIERS FOR ACTIVATED CHARCOAL

This invention relates to agricultural foams used as carriers for agricultural chemicals. More specifically, this invention relates to formulations of foams to carry activated charcoal. These foams are designed to contribute improved methods of distributing uniformly specific chemicals at selected areas.

DEFINITIONS AND BACKGROUND

Agricultural foams contain whey solids derived from milk from which cheese is manufactured. Foams of the present invention are of whey solids origin. Whey solids are recovered from whey, the aqueous solution remaining after the curds are collected for cheese manufacture. Whey solids, among other compounds, contain a high content of lactose ranging from 67 to 78.5% and protein ranging from 7.5 to 51%.

Materials from which the whey solids of this invention are obtained originate with the dairy and cheese manufacturing industries. Whey solids are avaiable in a wide range of Trade Names reflecting gradations as to physical properties, prices, composition, and method of manufacture. Whey solids may be edible or inedible (feed-grade) depending on the method of manufacture. The majority of the edible whey solids are spray dried leaving the protein content of the solids essentially undenatured. Inedible or feed-grade whey solids are predominantly roller dried and the extent of denaturation of the protein would vary with the care exercised in drying the product. The whey solids of the present invention were selected for preparation of agricultural foams because they contain an appreciable content of protein in addition to the high lactose content.

B. H. Webb described the "Utilization of Whey in Foods and Feeds" in the proceedings of the Whey Utilization Conference, University of Maryland, June 1970. From this report we learn that the protein present in whey solids is lactalbumin and the milk sugar is lactose. If during recovery the lactose is crystallized, the product is stabilized and does not readily pick up moisture and cake. Likewise, if the whey solids are manufactured by foam-spray drying, the spherical particles will be readily dispersible and will not cake. The least expensive of the whey solids products are those that are roller dried and are suitable only for animal feed.

These agricultural foams contain glues derived from collagen which is a protein constituent of animal hide and bone. Foams of the present invention are of whey solids origin to which selected concentrations of hide glues are added to improve the desired characteristics. Hide glues are derived from collagenous materials present in hide pieces and in connective tissue associated with the hide. Collagen contains a disproportionately high content of hydroxyproline and proline, respectively 14% and 15%.

The glues of this invention originate with the packing and canning industries and are principally of cattle origin. As a group, hide glues are the strongest most versatile of animal glues with respect to broad usage in industry. The glues of the present invention were selected for preparation of the foams of this invention because they are basically protein.

The National Association of Glue Manufacturers, Inc., with headquarters in New York City, has prepared a booklet bearing the title "Animal Glue in Industry," describing an excellent overall view on glues. From this piece of literature we learn that "Animal glue is an organic colloid of protein derivation which meets with constantly increasing acceptance for adhesive, sizing and coating compositions, and colloidal applications in industry. The product is the oldest type of glue . . . ."

These agricultural foams contain a viscosity-builder, the active ingredient of which is a polysaccharide of molecular weight about 1,000,000, containing D-glucose, D-mannose and D-glucuronic acid in an approximatel 3:3:1 ratio. Both edible and industrial grades of this viscosity-builder are available and these were used singly or in combination with another polysaccharide that is a straight chain, regularly branched D-mannose polymer wherein each fourth mannose unit carries a D-galactose substituent. The latter can be used with the former in any weight ratio combination of 1 to 99 or vice versa.

Surfactants usd in these foams are generally selected from a group of modified long chain alkyl sulfates wherein the alkyl component ranges from $C_{12}$ to $C_{18}$ in combination with an approximately equal proportion of dodecyl ether of polyethylene glycol.

The agricultural foams contain activated charcoal which is a powdered carbon characterized by a very large surface area per unit volume because of an enormous number of fine pores. Foams of the present invention are of improved foam-producing compositions made of whey solids and animal hide glues to which selected concentrations of activated charcoal are added and are designed to contribute improved methods of uniformly distributing the charcoal at selected areas to bring about detoxification of the soil. Activated charcoal is derived from cellulose, wood, peat and coals of bituminous or lower rank by heating at 900°C for a brief period in air, carbon dioxide or steam to render it more porous and more efficient.

Sorptive properties of the activated charcoal result from a very large internal surface and detoxification of the soil depends on the capacity of the charcoal to absorb residual toxic herbicides and pesticides.

THE PRIOR ART

U.S. Pat. No. 2,875,555, issued Mar. 3, 1959, discloses the use of foam in protecting plants from frost damage to yield a botanical plant which would be free from frostation and would comprise covering at least the susceptible portion of said plant when danger of frost would be imminent, with an enveloping protective layer having the thickness of at least about one-half inch of a stable, long-lasting foam. These inventors disclose having covered a plant to the extent of 1-inch thickness with foam which would last at least 4 hours. According to the process of said invention, it is possible to produce a foam which will live overnight. The volume of foam produced by their process would be 10 times as great as the formulation from which it was produced. Polymer-forming materials were included in their formulations.

Comparatively, it should be noted that volumes of the foams of the present invention range between 24 and 26 times as great as the formulations from which they originated. However, in commercial-size equipment, expansions would be expected to range between 40 to 100 times depending on the specific make-up of the individual generators. The hide glues of the present invention are polymers; the viscosity-builder is a polymer or combination of two polymers; the whey solids are polymers; and no saponin is employed. The saponin used by others correspond to our surfactants, which happen to be high foaming agents. The polymeric materials employed by the prior art corresponds to our glues, viscosity-builder and whey solids. The activated charcoal is a principal additive since it is this chemical that is to be distributed uniformly on selected areas. The quantities which have led to our preferred embodiments indicate formulations which would contain approximately 0–2% whey solids, 0–2% animal glue, 0–0.1% viscosity-builder, 1–2% surfactant mixture and 1–6% activated charcoal depending on the character of the charcoal deposit desired. If the deposit is to remain topical, and a complete unbroken blanket is not needed, whey solids and/or animal glue and viscosity-builder may be mixed with the charcoal and surfactants. If, however, the charcoal must be deposited as a complete blanket then the whey solids and/or animal glue and viscosity-builder may be omitted.

In the prior art also we find an article by Paul A. Sanders which appears in Vol. 34 of the October 1969 issue of American Perfumer and Cosmetics under the title "Unusual Aqueous Aerosol Foams." The composition and properties of these foams have different uses than those of the agricultural foams of the present invention. Sanders' foams are principally for use as cosmetics and in pharmaceutical products, and are characterized as "snowflake foam," "crackling foam," "collapsing foam," "buoyancy foam," etc. Such materials would not be suitable for agricultural foams.

Activated charcoal has been used by P. D. Jordan and L. W. Smith as disclosed in the September 1971 issue of Weed Science for its adsorptive and detoxifying properties in neutralizing selected herbicide residues. Adsorption of 2-chloro-4-(ethylamino)-6-(isopropylamino)-S-triazine (Aatrex) and 3-(3,4-dichlorophenyl)-1,1-dimethylurea (Karmex) by an aqueous solution of activated charcoal was tested. Both of these herbicides are efficient weed-controllers, but residues of as little as 0.3 and 1.0 ppmw produce severe injury to oat seedlings. No reports of activated charcoal being applied in a foam medium have been found.

OBJECTIVES

The main objective of the present invention is to provide foam compositions to be used as carriers for activated charcoal and other agricultural chemicals. A secondary objective is to increase the effectiveness of the forming agent by incorporating therein polymeric materials and/or one or more proteinaceous materials.

The present invention deals with formulations which yield light weight, low cost, persistent foams prepared from agricultural products. The foams of this invention concern the protection of row crops from severe damage that might be caused by herbicidal residues. The foams of this invention have been designed to serve as carriers for agricultural chemicals, specifically activated charcoal.

In the investigative work leading to the present invention, several formulations were tested and found effective. With reference to the persistence and expansion of the foam, it was determined that these qualities could be enhanced by the addition of a combination of surfactants, a viscosity-builder, animal glue and whey solids.

THE PROBLEM

The objective of the work was to develop low-cost formulations that could be generated into foams as carriers for chemicals--such as activated charcoal while maintaining all other requirements for agricultural foams. Requirements for such foams include low cost, easy generation, zero toxicity (for both plants and animals) and, sufficient durability to maintain the chemical additive in a stable suspension that permits its uniform distribution in a broadcast application over the desired area requiring detoxification. Foam application should overcome drift and deposit charcoal in a thin unbroken blanket with sufficient continuity, tenacity and cohesiveness as to be undisturbed by the wind until it can be plowed under.

The preferred foam formulations contain specified quantities of whey solids, animal glues and activated charcoal which are most suitable. The most suitable whey solids are the subject of an earlier patent application (Ser. No. 374,731) as are the animal glues (Ser. No. 203,836) now U.S. Pat. No. 3,923,573. Formulations were evaluated for persistence, expansion and deposit patterns from a 1-inch deep blanket. Rapid screening tests were employed to determine suitable concentrations of whey solids, animal glue, viscosity-builder, mixture of surfactants, and activated charcoal for formulations, basing evaluations of the tests on persistence of the foams, liquor drainage and compatibility at room temperature. Guidelines for incorporating the activated charcoal were developed during these tests.

DETAILS OF THE RAPID SCREENING TEST

Once the components of the foaming agents were determined, these were weighed and dissolved in water to obtain a colloidal suspension of exactly 100 ml. Activated charcoal, ranging in concentration from 1–6%, was prewetted with a surfactant A or B an then mixed with the collidal suspensions. Each formulation was whipped at high speed with an electric mixer for 5 min. using a rubber spatula to develop the foam. The volume expansion of the foam was measured and recorded. Six hundred ml. beakers were filled with foams and observed at room temperature (74°F) and outdoors (80°–100°). The time required for the foam to subside to one-third of its original volume plus drainage was recorded. Duplicate quantities of foaming mixture containing activated charcoal were whipped as above. The entire volume of foam generated was spread 1-inch deep over circular filter paper 13 inches in diameter. Foam disintegration time was recorded and charcoal deposition patterns were photographed. At least 4% charcoal was required to yield a thin unbroken blanket of the additive. The formulation must contain at least one component that will provide cohesiveness and tenacity to keep the charcoal deposit from being removed by the wind, unless it is to be plowed under immediately.

The rapid screening test provided the investigators with a means of selecting the preferred concentrations of components which would be useful in processing through a pilot scale foam generator. All of the components were of commercial manufacture and are considered part of the invention only in that specific notation is preferred though not recommended nor claimed as part of the invention.

We have discovered that previously disclosed foam precursor compositions containing whey solids and animal glues can be modified to produce foams that will maintain chemical additives such as activated charcoal in stable suspensions. Uniform distribution of the activated charcoal in a broadcast application over the desired area to be detoxified is possible. At a concentration of 4% activated charcoal, a foam blanket 1-inch in depth will deposit a thin unbroken charcoal cover. Protection from wind is provided by inclusion of the whey solids and/or animal glues.

Prewetting the activated charcoal with surfactant A, a modified long chain alkyl sulfate or surfactant B, a dodecyl ether of polyethylene glycol provided the means of dispersing the activated charcoal uniformly in a finely divided state (no lumps) throughout the foam precursor formulation to which the second surfactant, whether A or B is second, had been added. No separation occured when the charcoal was added and no difficulties were encountered in the foaming of the formulation.

Foams stable at temperatures of 90° to 100°F, possessing tenacity and cohesiveness, could be generated from a formulation containing 1–2% of the combined surfactants, 1–6% activated charcoal-containing 0–2% of animal glue, 0–2% of whey solids, and 0–0.1% of polysaccharide viscosity builder. The following examples are provided to illustrate the invention, utilizing the preferred embodiments and are not to be construed as limiting the invention in any manner whatever.

Formulations containing whey solids, animal glue, a polysaccharide viscosity-builder and two surfactants, A and B, are shown to have the capacity of suspending 1 to 6% activated charcoal as outlined in Table A.

TABLE A

FOAM FORMULATIONS THAT SUSPEND CHARCOAL (Rapid Tests)

| % Composition of Formulations | | | | | | | Hrs. of Persistence at | |
|---|---|---|---|---|---|---|---|---|
| WS | AG | Visc. Bldr. | Surf. A | Surf. B | Charcoal | Expansion | 74°F | 96°F |
| 2.0 | 1.0 | 0.1 | 1.0 | 1.0 | 6 | 24 | 4 | 1 |
| 1.0 | 2.0 | 0.1 | 1.0 | 1.0 | 6 | 21 | 2.8 | 0.8 |
| 1.0 | 1.0 | 0.1 | 1.0 | 1.0 | 6 | 22 | 3.3 | 1 |
| 1.0 | 1.0 | 0.1 | 1.0 | 1.0 | 6 | 24 | 3.3 | — |
| | 2.0 | 0.1 | 1.0 | 1.0 | 6 | 19 | 1 | 0.5 |
| | 1.0 | 0.1 | 1.0 | 1.0 | 6 | 26 | 3.5 | 1 |
| | 1.0 | 0.1 | 1.0 | 1.0 | 2 | 24 | 3 | 0.5 |
| | 1.0 | 0.1 | 0.5 | 0.5 | 1 | 22 | 3.7 | 0.5 |

Conclusions drawn from Table A include: Expansions ranged from 19–26X, displaying good foaming capacities in spite of the addition of 1–6% activated charcoal. All formulations suspended the charcoal uniformly. Persistence up to 4 hours was obtained permitting the charcoal to make wet contact for a considerable period. The presence of whey solids, animal glue and the polysaccharide insure a certain tenacity and cohesiveness to the charcoal after the foam subsides obviating the possibility that it will be blown away by the wind when dry. No difficulties are expected in up-scaling the formulations for use in commercial farm equipment.

Persistences for foam blankets 1 inch deep and 13 inches in diameter were found to range from 0.3 to 1.5 hours at 74°F as outlined in Table B.

TABLE B

PERSISTENCE OF FOAM BLANKETS 1" DEEP AND 13" IN DIAMETER

| % Composition of Formulations | | | | | | | |
|---|---|---|---|---|---|---|---|
| WS | AG | Visc. Bldr. | Surf. A | Surf. B | Charcoal | Expansion | Hrs. Persistence at 74°F |
| — | 1.0 | 0.1 | 1.0 | 1.0 | 2 | 24× | 1.5 |
| — | — | 0.1 | 1.0 | 1.0 | 2 | 26× | 1.5 |
| — | — | — | 0.5 | 0.5 | 4 | 22× | 0.3 |
| — | — | — | 0.5 | 0.5 | 3 | 24× | 1 |
| — | — | — | 0.5 | 0.5 | 2 | 26× | 1.3 |
| — | — | — | 0.5 | 0.5 | 1 | 26× | 1.0 |

The following conclusions may be drawn from Table B: Expansions increase as concentrations of activated charcoal decrease. There is a trend toward increasing persistence as charcoal concentration decreases. A complete, unbroken blanket of charcoal can be deposited when using a concentration of 4% charcoal. The deposit is powdery when dry and could be easily dislodged and blown away by the wind.

Table C outlines the pounds of activated charcoal that can be deposited via the foam formulations with a foam depth of only 1-inch.

TABLE C

| Type of Application | Depth of Foam | Conc. of Charcoal in Formulation[1] | Charcoal Deposited Lbs./Acre | Type of Deposit[2] |
|---|---|---|---|---|
| Broadcast | 1" | 1% | 96 | Irregularly deposited thin and dense areas interspersed. |
| Broadcast | 1" | 2% | 192 | Same as above but sl. heavier. |
| Broadcast | 1" | 3% | 288 | Almost complete thin blanket. |
| Broadcast | 1" | 4% | 384 | Complete unbroken blanket. |

[1]Contains combination of surfactants A & B only with charcoal.
[2]Deposits could easily be blown away by the wind.

Conclusions from Table C are: Deposits of activated charcoal of 100 pounds to 400 pounds per acre are possible by broadcast applications of foam carrying charcoal formulations. Depth of foam is one-inch. A complete unbroken blanket of charcoal was deposited only at the 4% concentration. At 3% the charcoal cover was almost but not entirely unbroken. At 1 and 2% concentrations the deposits were irregular. Deposits adhered to the undersurface only when animal glue and the viscosity builder were added to the surfactant mixture. Then the deposit patterns were fine and lace-like, not a complete cover.

SUMMARY

The present invention can best be described briefly as a group of foam-precursor compositions containing about from 1 to 6% of activated charcoal, about not more than 2% of a proteinaceous material, such as whey solids and/or animal hide glue, about not more than 0.1% of a viscosity-builder polysaccharide of about 1,000,000 molecular weight, and about from 1 to 2% of a surfactant mixture consisting of equal parts of dodecyl ether of polyethylene glycol and a long chain alkyl sulfate, the said surfactant mixture comprising about 0.5% by weight with respect to the said activated charcoal.

We claim:

1. An aqueous foam-precursor composition containing:
   a. about from 1% to 6% by weight of activated charcoal,
   b. about 2% by weight of a spumific material selected from the group consisting of:
      proteinaceous-carbohydrate whey solids,
      proteinaceous animal hide glue, and
      a mixture of the whey solids and the animal hide glue,
   c. not more than about 0.1% by weight of a viscosity builder polysaccharide of about 1,000,000 molecular weight, and
   d. about from 1% to 2% by weight of a surfactant mixture consisting of equal parts of dodecyl ether of polyethylene glycol and an ammonium alkyl sulfate in which the carbon chain ranges from $C_{12}$ to $C_{18}$, said surfactant mixture used in an amount equivalent to 0.5% of the weight with respect to said activated charcoal, and
   d. sufficient water to make 100% by weight.

2. The composition of claim 1 wherein the proteinaceous material is whey solids.

3. The composition of claim 1 wherein the proteinaceous material is animal hide glue.

4. The composition of claim 1 wherein the proteinaceous material is a mixture of whey solids and an animal hide glue.

5. The composition of claim 1 wherein the polysaccharide contains D-glucose, D-mannose, and D-glucuronic acid, respectively in a ratio of about 3:3:1.

6. A foam precursor composition that can be generated to a foam capable of retaining its uninterrupted continuity for about from 1 to 4 hours in a temperature of about from 74° to 100°F from which a complete blanket of activated charcoal is deposited on the soil surface to be useful in removing from the soil residual toxic herbicides and/or pesticides which may cause damage to a sensitive succeeding crop, said foam precursor composition consisting of a homogeneous suspension of water containing:
   a. about from 1 to 6% by weight of activated charcoal,
   b. about from 1 to 2% by weight of a spumific material selected from the group consisting of proteinaceous-carbohydrate whey solids, proteinaceous animal hide glue, and a mixture of the whey solids and the aminal hide glue,
   c. about from 1 to 2% by weight of a surfactant mixture of equal parts of dodecyl ether of polyethylene glycol and an ammonium alkyl sulfate of carbon chain length in the range of $C_{12}$ to $C_{18}$, said surfactant mixture used in an amount equivalent to 0.5% of the weight of the activated charcoal,
   d. about 0.1% by weight of a mixture of a viscosity-builder polysaccharide of about 1,000,000 molecular weight ($x$), containing D-glucose, D-mannose, and D-glucuronic acid, respectively in a ratio of 3:3:1; and a straight chain regularly branched D-mannose polymer ($y$) wherein each fourth mannose unit carries a D-galactose substituent, said mixture being used in any weight ratio combination of 1 to 99, or vice versa, with respect to the proportions of ($x$) and ($y$), and
   e. sufficient water to add up to 100% by weight.

* * * * *